(12) United States Patent
Snidow

(10) Patent No.: US 9,318,995 B2
(45) Date of Patent: Apr. 19, 2016

(54) PORTABLE FOLDING PHOTOVOLTAIC MODULE

(71) Applicant: Scuint Corporation, Austin, TX (US)

(72) Inventor: Steven B Snidow, Austin, TX (US)

(73) Assignee: Scuint Corporation, Austin, TX (US)

( * ) Notice: Subject to any disclaimer, the term of this patent is extended or adjusted under 35 U.S.C. 154(b) by 61 days.

(21) Appl. No.: 14/167,981

(22) Filed: Jan. 29, 2014

(65) Prior Publication Data

US 2015/0214404 A1  Jul. 30, 2015

Related U.S. Application Data

(60) Provisional application No. 61/757,938, filed on Jan. 29, 2013.

(51) Int. Cl.
*H02S 30/20* (2014.01)
*F24J 2/54* (2006.01)

(52) U.S. Cl.
CPC .......... *H02S 30/20* (2014.12); *F24J 2002/5486* (2013.01)

(58) Field of Classification Search
CPC ..... H01L 31/00; H01L 31/02; H01L 31/0203; H01L 31/048; H01L 31/053; H02S 40/38; H02S 30/00; H02S 30/10; H02S 30/20
See application file for complete search history.

(56) References Cited

U.S. PATENT DOCUMENTS

| | | | |
|---|---|---|---|
| 5,522,943 A | 6/1996 | Spencer et al. | |
| 5,961,738 A * | 10/1999 | Benton et al. | 136/245 |
| 5,969,501 A | 10/1999 | Glidden et al. | |
| 7,524,079 B2 | 4/2009 | Greenhoe | |
| 7,982,428 B2 | 7/2011 | Kim | |
| 8,050,723 B2 | 11/2011 | Hsiao | |
| 8,201,963 B2 | 6/2012 | Peterson | |
| 2005/0161079 A1 * | 7/2005 | Gray | 136/291 |
| 2009/0102415 A1 * | 4/2009 | Muchow et al. | 320/101 |
| 2010/0156339 A1 * | 6/2010 | Hoffman | 320/101 |
| 2011/0309085 A1 * | 12/2011 | Patton | 220/560 |

OTHER PUBLICATIONS

English machine translation of Kurosawa (JP 2006-278669) published on Oct. 12, 2006.*
FAQ information from Pelican TM retrieved on Aug. 1, 2015 from http://www.pelican-case.com/faq.html.*

* cited by examiner

*Primary Examiner* — Christina Chern

(57) ABSTRACT

A portable photovoltaic device comprised of photovoltaic sections separated by one, or more, hinges and that provides for the photovoltaic sections to be collapsed or expanded for the alternative purposes of transportation or charging.

3 Claims, 10 Drawing Sheets

FIG. 4A
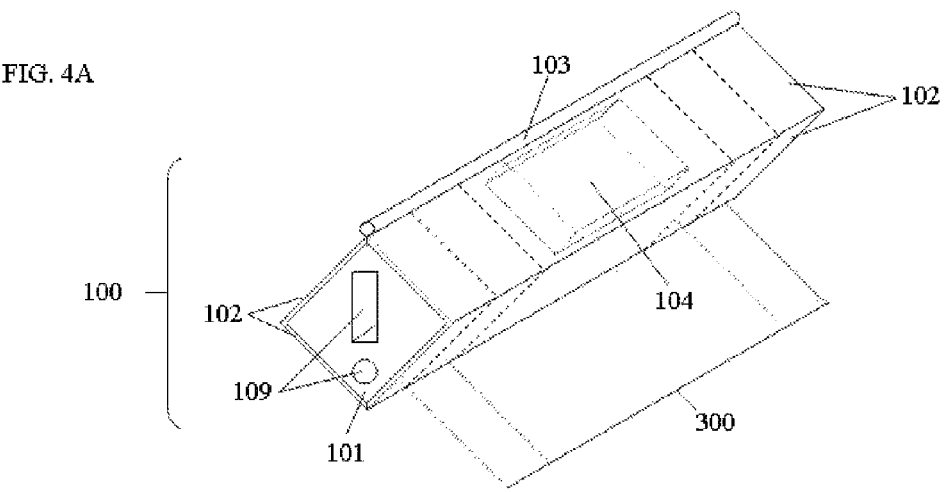
FIG. 4B
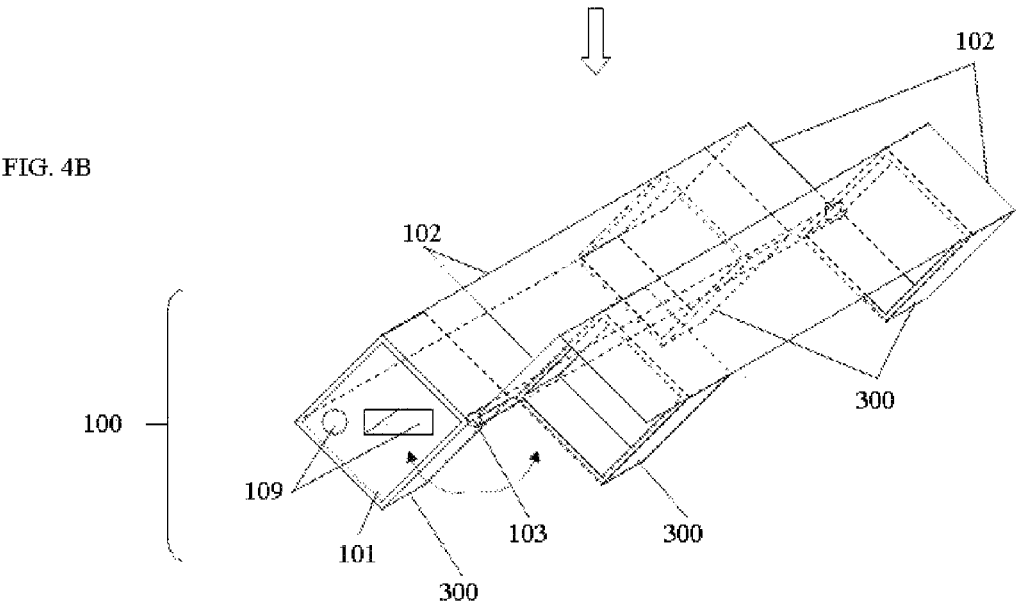
FIG. 4

FIG. 6A
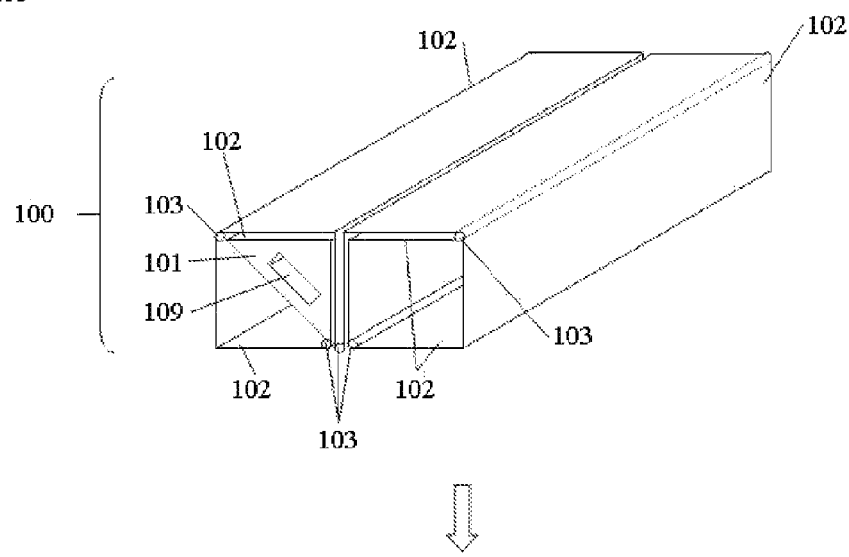
FIG. 6B
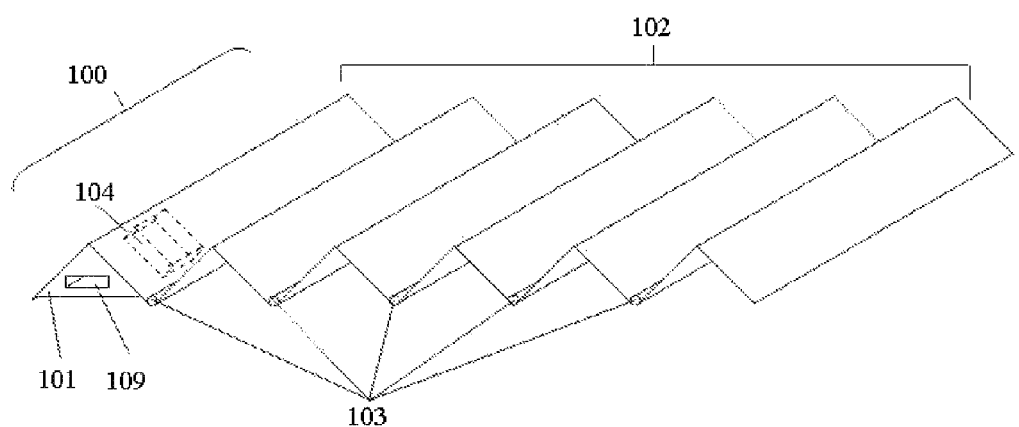
FIG. 6

PORTABLE FOLDING PHOTOVOLTAIC MODULE

CROSS-REFERENCE TO RELATED APPLICATIONS

This application claims the benefits of the filing of U.S. Provisional Patent Application Ser. No. 61/757,938 entitled, Portable Folding Photovoltaic Module, filed Jan. 29, 2013 and the specification thereof is incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

TECHNICAL FIELD

The present invention is in the technical field of photovoltaic devices. More particularly, the present invention is in the technical field of portable small-scale to large-scale photovoltaic panels (modules) and related devices.

BACKGROUND OF THE INVENTION

Conventional designs of photovoltaic panels, certain electrical devices and portable charging devices that are photovoltaic enabled are typically constrained by the design of the solar photovoltaic cells wherein the flat photovoltaic cells often lead to flat photovoltaic panels or flattened sections of other devices wherein the flattened section contains photovoltaic cells.

Such constraints are driven, additionally, by the common perception that photovoltaic cells are most productive in generating electricity when placed perpendicular to a common light source and also by the physical attributes of photovoltaic cells that may bend and warp when placed in a heat-stress environment such as under direct sunlight.

The results are seen in the marketplace today in the form of a flashlight whose handle has a large flat section containing photovoltaic cells and in the form of multiple photovoltaic-based charging devices whose photovoltaic source is comprised of photovoltaic cells placed within a single-fold or multi-fold rigid envelope and in the form of other photovoltaic-enabled devices that display similar functionality such LED lights and lanterns with a flat photovoltaic cell embedded into the top of the device. Where the need for portable or remote access of energy is present, in the marketplace, we also see photovoltaic power units built to conform to the end user's needs for portability and power. The needs of the marketplace have been attempted to be addressed in multiple ways and the below patents indicate.

U.S. Pat. No. 5,522,943 (Jerald C. Spencer et al; Jun. 4, 1996) teaches us of a portable photovoltaic power supply that is primarily comprised of a folding panel with one hinge and whose two sides include embedded photovoltaic cells. The photovoltaic folding unit is, as a unit, configured so at to be optionally attached to a receiving case such as a portable computer (laptop) carrying case. Once attached to the case, the photovoltaic unit will have one side affixed to the case and allowing the other side to unfold along the hinge side and revealing both interior sides which contain the photovoltaic cells. The invention is further comprised to have a power interconnection for the purposes of providing electricity to another device such as a laptop computer. This invention may also be configured to have one photoactive side inside a carrying case such as a satchel. Altogether, this invention provides one method of providing portable photovoltaic energy to a secondary device while also addressing the need to fit within the general confines of existing solutions (e.g., the dimensions of the carrying case).

U.S. Pat. No. 5,969,501 (Steven C. Glidden et al; Oct. 19, 1999) teaches us of a larger portable photovoltaic power supply that is primarily comprised of a number of solar panels mounted onto a box trailer. More specifically, a typical box trailer mounted on an axle has mounted to its exterior a plurality of mounting racks onto which individual solar (photovoltaic) panels can be affixed such as the roof, left and right sides of the trailer. The mounting of the panels provides the further ability to deploy the solar panels. This invention provides for the utility of larger-scale, but still portable, electricity generation while addressing the need to reduce the footprint of solar devices for transportation.

U.S. Pat. No. 8,050,723 (Bor-Yuan Hsiao; Nov. 1, 2011) teaches us of a portable electronic device having solar cell module and that is shown, within the patent, as a portable cellular phone that contains a photovoltaic cell section within its exterior encasement and whose purpose is to power the electronics held within that phone encasement. This patent seeks to address the need for additional electrical consumption driven by portable electronic devices and where the ability for an end user to gain access to electricity (e.g., through the main power system and matching plugs and interconnections) is uncertain.

U.S. Pat. No. 8,201,963 (Terry J. Peterson; Jun. 19, 2012) teaches us of a flashlight with photovoltaic power source and wherein a typically formed flashlight with elongated handle, batteries and a terminal end with light source and lens is modified to include a photovoltaic power source. Specifically, the typically round but elongated handle is modified to be partially rounded and with a distinct flat surface and where flat surface contains the photovoltaic cells that are then interconnect to the flashlight's power system. This patent demonstrates the utility of using photovoltaics as a remote and portable power source.

U.S. Pat. No. 7,524,079 (William J. Greenhoe; Apr. 28, 2009) teaches us of a solar (photovoltaic) rechargeable lantern that is comprised of multiple parts including a self-standing flashlight, battery, reflector and separate photovoltaic cells. The flashlight portion of this invention contains the rechargeable battery unit and may be stood vertically such that the direction of illumination is upward and further configured to accept an inverted conical reflector on top the light source thus reflecting the light to the sides and providing scattered illumination as a lantern and not directed illumination as a flashlight. This patent also demonstrates the utility of using photovoltaics as a remote and portable power source while also demonstrating the use of photovoltaic power sources as a secondary, add-on, device.

U.S. Pat. No. 7,982,428 (Hyoung Sup Kim; Jul. 19, 2011) teaches us of an apparatus and method of recharging a battery using a USB device in a portable device wherein the charge of a battery is detected and the battery is recharged with the maximum current provided by the USB connection and thus shortening the recharge time. This invention provides an improvement on use of USB connections for the charging and recharging of portable devices while also setting a precedent for such charging and recharging.

SUMMARY OF THE INVENTION

The present invention is a portable photovoltaic recharging power source that contains at least one common form of electrical interconnection to other devices and whereby the present invention may power and/or recharge those other devices. Present invention is comprised of photovoltaic sections that may be angled and that may be physically interconnected by a hinge allowing the photovoltaic sections to collapse and/or fold into a smaller configuration providing for improved portability of the present invention.

The primary objective of the present invention is to provide improve portability of photovoltaic recharging devices that retain a high photovoltaic-cell-to-device-size ratio that will help assure a more powerful solution to end users.

The primary advantage of the present invention is the relatively high photovoltaic-cell-to-device-size ratio that enables an end user to carry a portable version of a larger, equivalent, photovoltaic device.

An additional advantage of the present invention is the use of one, or more, hinges to provide not only the above advantage but also the advantage of a photovoltaic device in a collapsible, rigid and protective shell.

Another advantage of the present invention is the self-contained energy storage component, such as rechargeable batteries, that provide end user convenience and that can be used to recharge another device(s) with a battery or otherwise directly power a secondary device.

Another advantage of the present invention is the use of Universal Series Bus (USB) male and female connections to provide electricity to and from the present invention.

Another advantage of the present invention is the use of rigid forms contained within the present invention when closed and that may be used as legs on which to set the present invention when open.

Another advantage of one embodiment of the present invention is the use of low-density polyurethane elastomer to form the rigid body of the present invention and where such elastomer's low-density allows the present invention to float in water because the low-density polyurethane elastomer constitutes at least 70%, by weight, the weight of the present invention.

Still another advantage of the present invention are the empty spaces and mounting slots contained within the present invention when closed and that may be used, together, to store ancillary devices that can be powered by the present invention.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

FIG. 4 is comprised of parts 4A and 4B that depict various view of a third embodiment of the present invention;

FIG. 6 is comprised of parts 6A and 6B that depict various view of a fourth embodiment of the present invention;

DETAILED DESCRIPTION OF THE INVENTION

Figure 1:
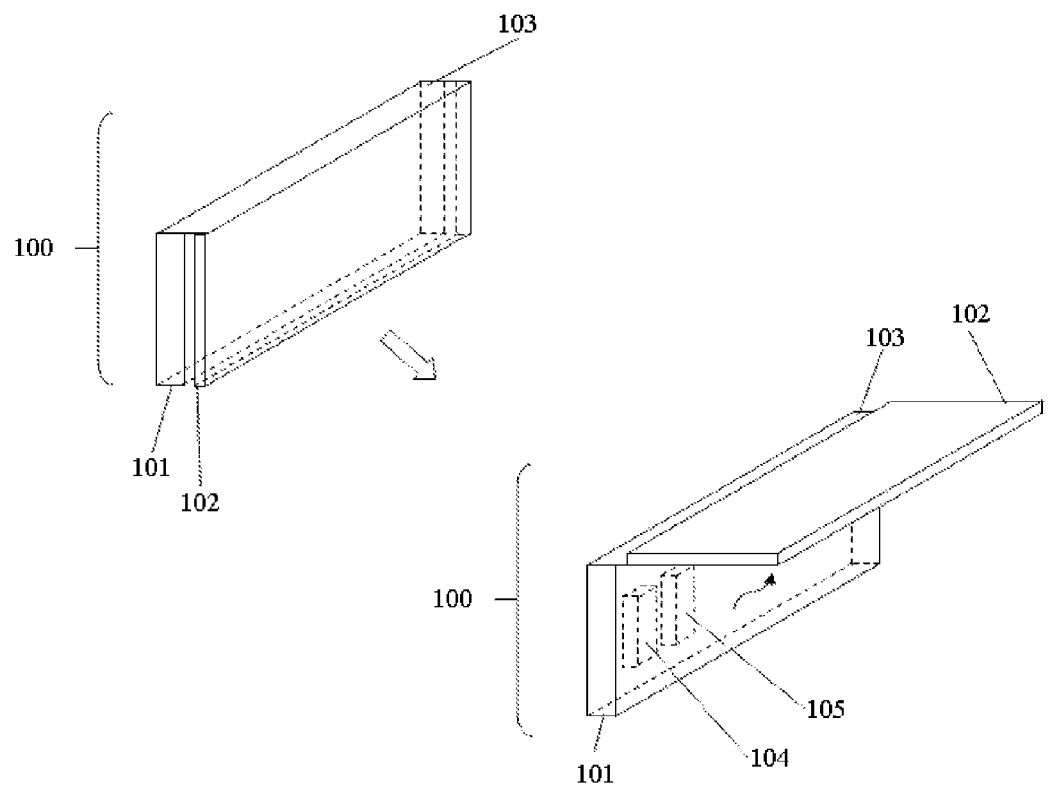
FIG. 1 is an isometric and semi-transparent view of the first embodiment of the present invention.

Referring to FIG. 1, the present invention 100 is shown as comprised by encasement 101, photovoltaic section 102 and hinge 103 and where encasement 101 should be understood to be a typical form, such as plastic, resin, or similar, material that may be used to form a solid or hollow form to house electronics or electrical devices. As shown, photovoltaic section 102 may be fixed but is shown as lifted from the body of encasement 101 and for the purposes of accessing optional energy storage component 104 and electrical/electronic service 105. It should be understood that the utility of hinge 103 and adjustable photovoltaic section 102 is to provide for improved portability of the folded unit and to provide for improved solar gain as a deployed unit. Additionally, it should be understood that hinge 103 may house or act as a conduit for electrical interconnection and that the present invention can be considered in an open, or deployed, position and, alternatively, in a closed, non-deployed position, and where the dimensions of encasement 101 are within the dimensions of the photovoltaic section 102. It should be further understood that for the purposes of FIG. 1 and all other figures energy storage component 104 can mean any combination of rechargeable battery, such as a nickel-hydride battery or other energy storage component such as a capacitor(s).

Figure 2:
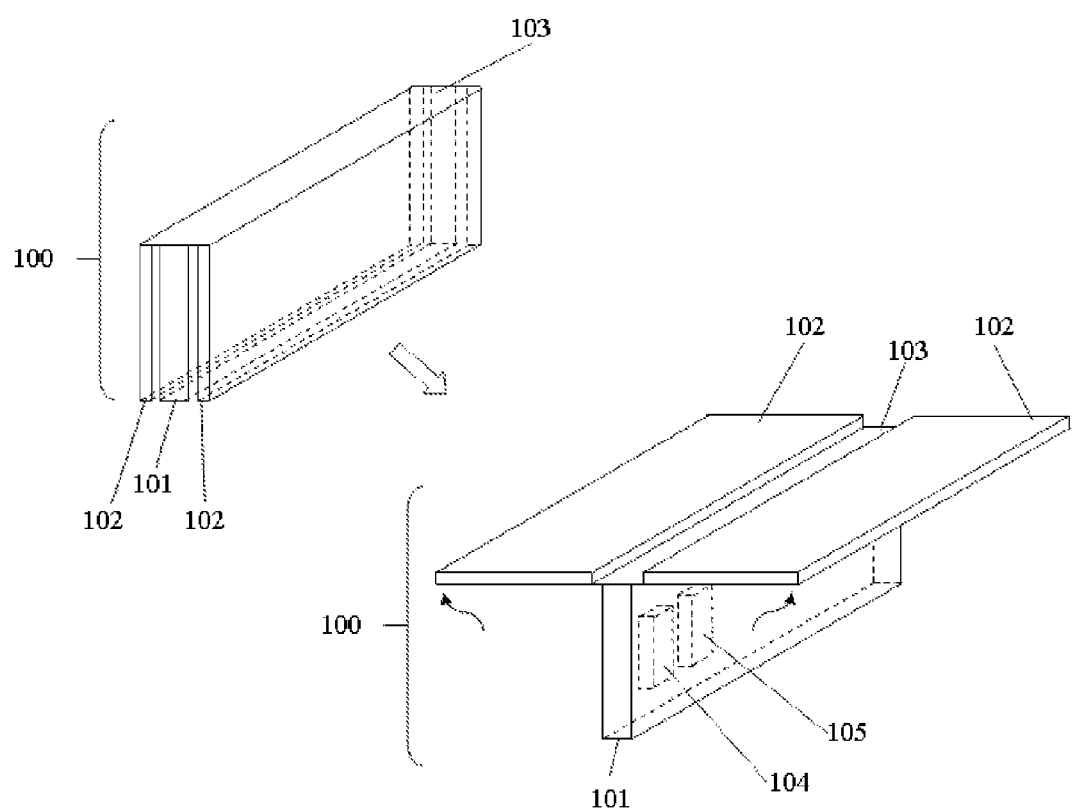
FIG. 2 is an isometric and semi-transparent view of a second embodiment of the present invention.

Referring now to FIG. 2, the present invention 100 is shown as a second embodiment that is comprised of encasement 101, two photovoltaic sections 102 and hinge 103 and where encasement 101 should be understood to be a typical form, such as plastic, resin, or similar material, that may be used to form a solid or hollow form to house electronics or electrical devices. As shown, photovoltaic sections 102 may be lifted from the body of encasement 101 and for the purposes of accessing optional energy storage component 104 and electrical/electronic service 105. It should be understood that the utility of hinge 103 and adjustable photovoltaic section 102 is to provide for improved portability of the folded unit and to provide for improved solar gain as a deployed unit. The improved utility of this second embodiment of the present invention is to add the second photovoltaic section with little additional space required in the folded configuration. Additionally, it should be understood that hinge 103 may house or act as a conduit for electrical interconnection and that encasement 101 may include an external electrical connection such as a USB and that the present invention can be considered in an open, or deployed, position and, alternatively, in a closed, non-deployed position, and where the dimensions of encasement 101 are within the dimensions of the photovoltaic sections 102.

Figure 3:
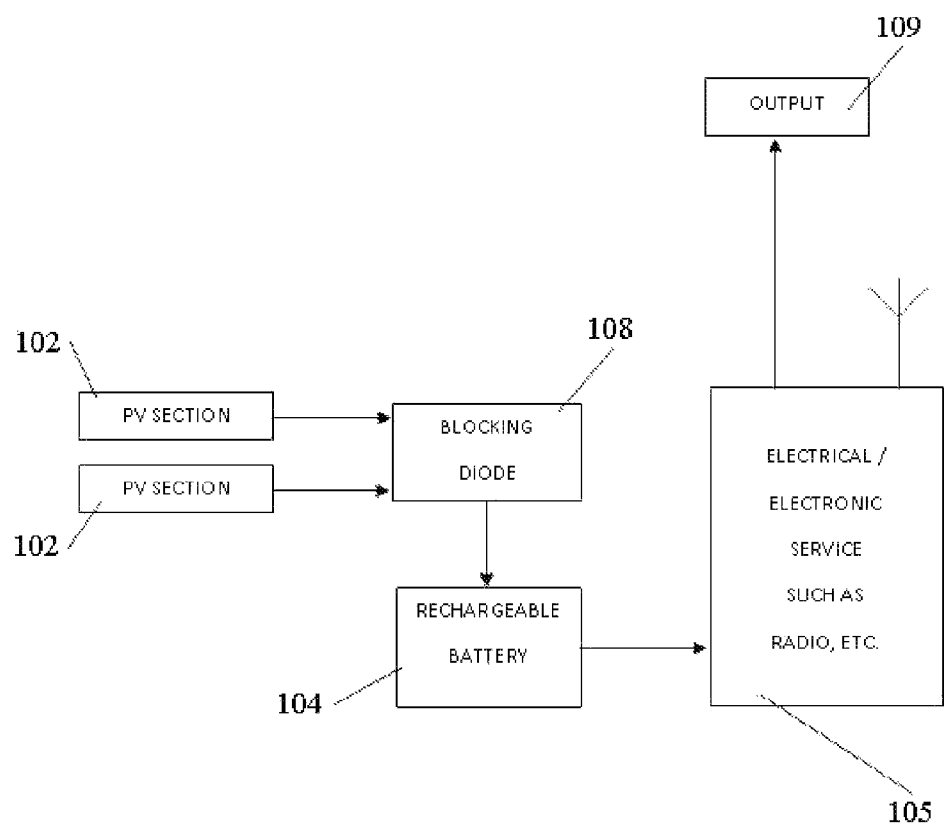
FIG. 3 is a block diagram of the present invention.

Referring now to FIG. 3, is a block diagram showing the gain of electricity through photovoltaic sections 102 and where the electrical current will flow a blocking diode 108 to energy storage component 104 that may then deliver electricity on-demand to and electrical/electronic service 105, such as a radio, or other function, and that may then be further delivered to an output device 109 such as a headphone jack, LED light or USB connection. It should be understood the primary purpose of blocking diode 108 is to prevent electrical current for energy storage component 104 to flow backward to photovoltaic sections 102 creating potential damage to photovoltaic sections 102. It should be further understood that FIG. 3 is a simplified block diagram representing only one method of electrical interconnection.

Referring now to FIG. 4, FIG. 4 is comprised of two parts FIG. 4A and FIG. 4B. FIG. 4A shows a third embodiment of the present invention 100 in a closed position and where the present invention 100 is comprised of encasement 101, four photovoltaic sections 102, hinge 103, four support stands 300, output devices 109 and energy storage component 104. Electrical/electronic service 105 are not depicted but may be assumed as integral to output devices 109. As shown, encasement 101, support stands 300, output devices 109 and other elements, such as the not shown energy storage component 104, are all contained within photovoltaic sections 102 in their closed, or non-deployed, position.

By contrast, FIG. 4B depicts the same third embodiment of the present invention 100 in an open configuration and where present invention 100 is comprised of encasement 101, four photovoltaic sections 102, hinge 103, four support stands 300 and out devices 109. For the purposes of illustration, energy storage component 104 and electrical/electronic service 105 are not depicted but may be assumed. As depicted in FIG. 4B, present invention 100 opens in either direction from hinge 103. Support stands 300, shown as diamond-shaped, then form an armature on which present invention 100 may be placed onto a surface and remain raised above that surface. For purposes of further understanding, support stands 300 may be solid, hollow or hollow and made solid with an encasement material and may, therefore, also be used as a housing unit for electronics, wiring, batteries and storage. It should be further understood that the four photovoltaic sections depicted can be placed into an angled configuration wherein two photovoltaic sections 102 can be fixed to one another lengthwise and forming a base "L" cross-section. Alternatively, the components of two photovoltaic sections 102 can be placed into an elongated "L" shaped rigid shell such as polycarbonate angle.

Figure 5:
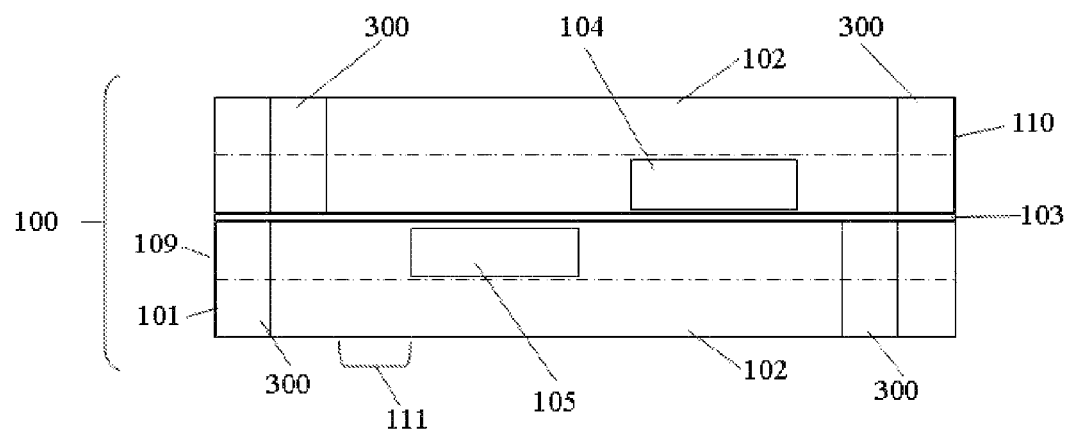
FIG. 5 is a bottom view of the present invention as shown in FIG. 4 and in an open position.

Referring now to FIG. 5, shows the third embodiment of the present invention 100 from the bottom perspective and in an open configuration to further illustrate the composition of present invention 100. As shown, present invention 100 is comprised of two elongated "L" shaped photovoltaic sections 102, hinge 103, four support stands 300, energy storage component 104, electrical/electronic service 105, encasement 101, output devices 109 and input device 110. For the purposes of understanding, support stands 300 may be constructed of a rigid and strong material such as aluminum. As shown, one support stand 300 may contain encasement 101 that also serves to support and secure output devices 109. Input device 110 is added in this depiction and may be understood to be a USB, or other, port that may allow for a secondary external source, such as main power, to provide electricity for the recharging of energy storage component 104. Vacant space 111 is identified as planned empty spaces within present invention 100 and that may be used for the storage of ancillary components. It should be further understood that present invention 100 may contain one, or more, vacant spaces 111.

Referring now to FIG. 6, demonstrates a fourth embodiment of present invention 100 and where FIG. 6 is comprised of FIG. 6A and FIG. 6B. Referring now to FIG. 6A, present invention is 100 is comprised of encasement 101, multiple photovoltaic sections 102, multiple hinges 103 and output device 109. For the purposes of illustration, energy storage component 104 is not shown but may be understood to be housed within encasement 101. It should further be understood that photovoltaic sections 102, as depicted, are an elongated "L" shape and forming, as shown, six photovoltaic sections 102 and where each side of the "L" cross-section is photoactive. The six elongated "L" shaped photovoltaic sections 102 are connected by five hinges 103 and allowing for the folding of each photovoltaic section 102 into its adjacent photovoltaic section 102 and forming a nested series. The center hinge 103 provides for the separation of two nested groupings of photovoltaic sections 102.

Referring now to FIG. 6B, the fourth embodiment of present invention 100, as described in FIG. 6A, is shown in a deployed configuration. Present invention 100 is comprised of encasement 101, six photovoltaic sections 102, five hinges 103 and output device 109. The elongated "L" shape of each photovoltaic section 102 may now be further understood to for a rigid "L" shape and such that, as depicted, the resulting photovoltaic array has a corrugated appearance. For the purposes of illustration, energy storage component 104 is now shown but may be understood to be housed within encasement 101. It should be further understood that in order to affect the nesting of photovoltaic sections 102, each subsequent photovoltaic section 102 from the center hinge 103 is marginally smaller in dimension that the preceding photovoltaic section 102. As shown, and for further understanding, the utility of hinge 103 to act additionally as an electrical conduit can be understood and allowing for the multiple photovoltaic sections 102 each to provide electricity to energy storage component 104 and where photovoltaic sections may be electrically interconnected in series, parallel or in a combination of series and parallel.

Figure 7A:
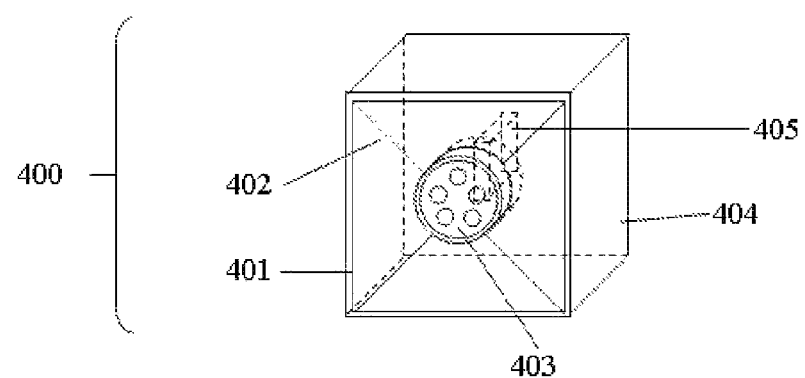
FIG. 7 is comprised of parts 7A and 7B that depict an add-on and ancillary component that may be attached to the present invention.
Figure 7B:
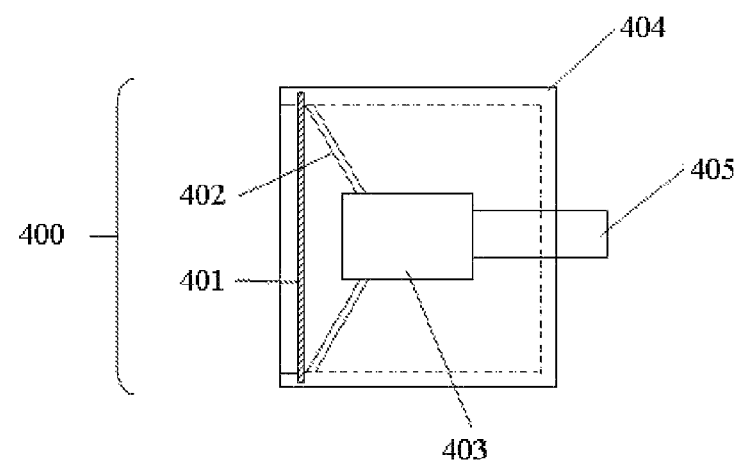

Referring now to FIG. 7, FIG. 7 is comprised of FIG. 7A and FIG. 7B representing two alternative views of add-on device 400. Referring now to FIG. 7A, add-on device 400 is shown as a flashlight comprised of clear lens 401, reflector 402, lighting source 403, rigid encasement 404 and electrical interconnect 405. Referring now to FIG. 7B, a side and transparent view of add-on device 400 is shown and where add-on device 400 is comprised of clear lens 401, reflector 402, lighting source 403, rigid encasement 404 and electrical interconnect 405. Electrical interconnect 405 can be understood to be a common form of electrical interconnect, such as a male USB connection, that protrudes from rigid encasement 404 and that marries to a receiving electrical interconnection such as a female USB port. It should be understood that lighting source 403 may be comprised of a bulb and socket, LED bulbs or other, similar, device.

Figure 8A:
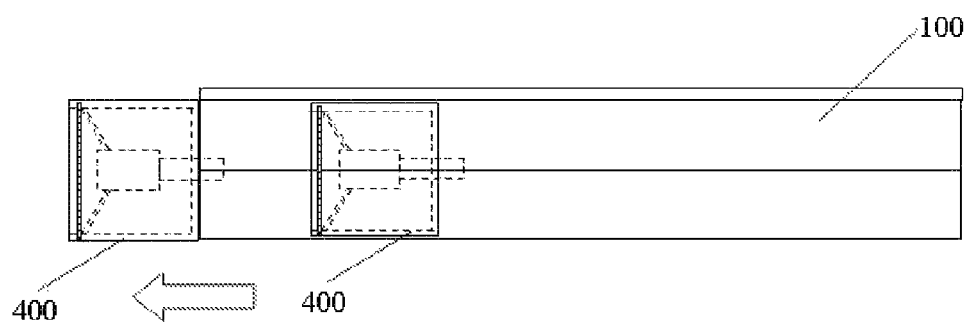
FIG. 8 is comprised of parts 8A and 8B that depict an add-on and ancillary component that is stored within and attached to the present invention.
Figure 8B:
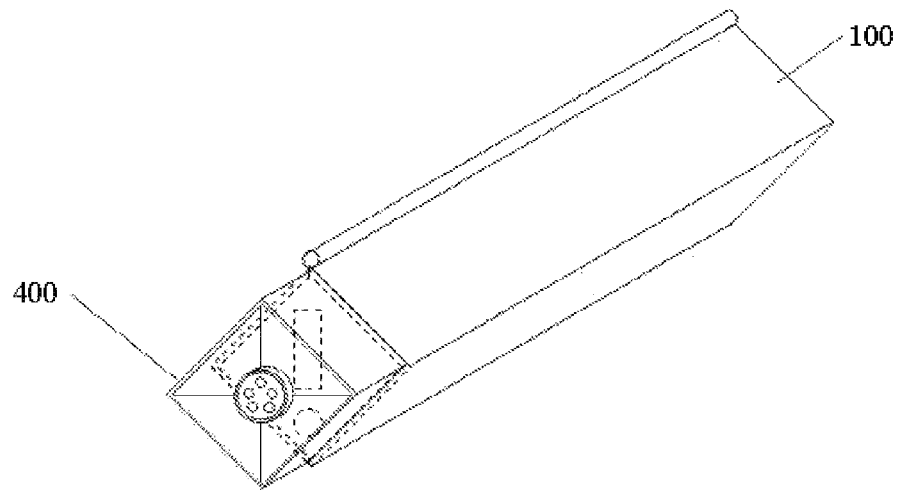

Referring now to FIG. 8, FIG. 8 is comprised of FIG. 8A and FIG. 8B and each figure shows an alternative view of add-on device 400 as connected to present invention 100. For the purposes of understanding, add-on device 400 is an ancillary and optional add-on part to present invention 100. As depicted, add-on device 400 has no battery and therefore relies on its electrical interconnect for power. As a combined, attached, unit, add-on device 400 and present invention 100 may be understood to have the same functionality of a traditional flashlight with an elongated handle that, typically, contains conventional batteries. For further understanding, while add-on device 400 is depicted as a flashlight, it should be understood to be any electrical and/or electronic device that may be powered by present invention 100 such as a lantern, radio, digital music player or other device and where each alternative embodiment of add-on device 400 is electrically and physically connected to present invention through an interconnection such as a USB connection. It should be further understood that FIG. 8A demonstrates add-on device 400 both as an attached, functional, component to the end of the present invention 100 and also contained, or stored, within the closed dimensions of present invention 100 and that may be understood to be contained in vacant spaces 111 of present invention 100.

Figure 9:
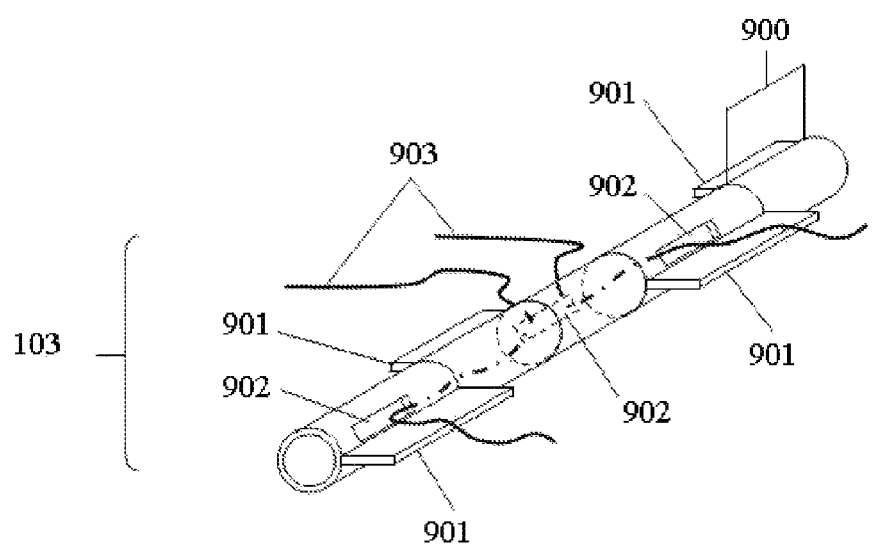
FIG. 9 is an optional hinge component of the present invention.

Referring now to FIG. 9, hinge 103 can be further understood to be comprised of multiple components that, as depicted, include multiple hinge sections 900, hinge flange 901 and hinge holes 902. As shown, hinge 103 forms a hollow tube or conduit. Hinge flanges 901 provide a means for securing hinge 103 to other devices. Hinge holes 902 provide a means for electrical wires 903 to be placed through hinge 103 providing a means for electricity to be connected from either side or either end of hinge 103 to the other side and/or end. It should be understood that FIG. 9 is meant only to demonstrate one possible configuration of a hinge containing hollow sections and wherein such hollow sections may provide the housing of electrical interconnection.

Figure 10A:
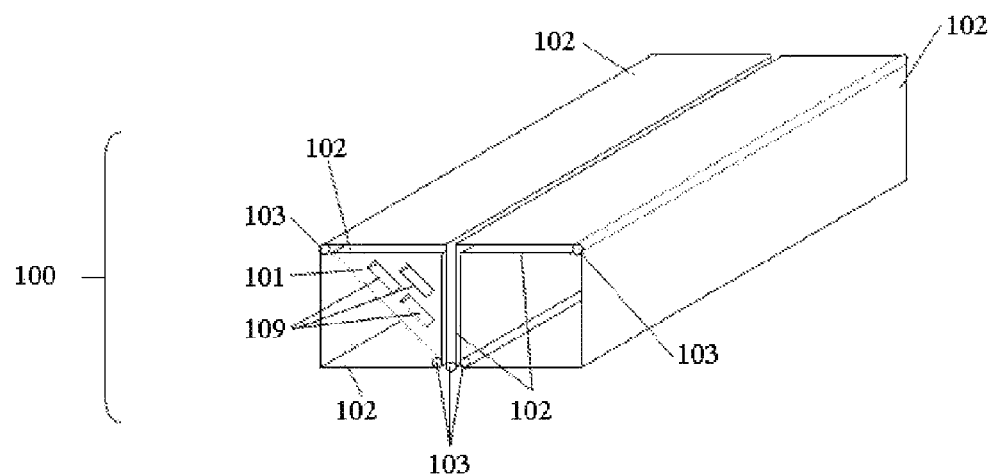
FIG. 10 is comprised of parts 10A and 10B and that show an isometric view to a fifth embodiment of the present invention and a contrast in size of different present invention embodiments.
Figure 10B:
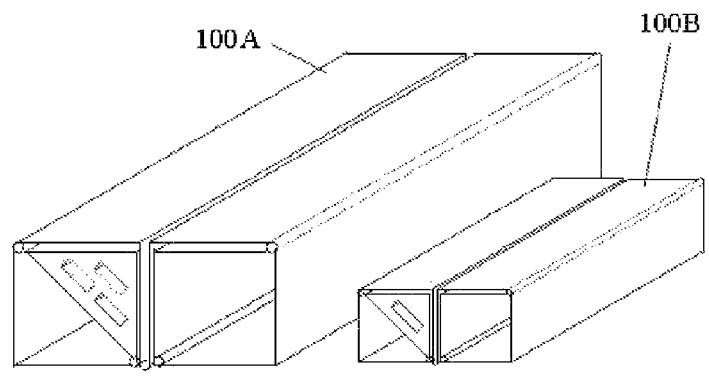

Referring now to FIG. 10, demonstrates a fifth embodiment of present invention 100 and where FIG. 10 is comprised of FIG. 10A and FIG. 10B. Referring now to FIG. 10A, present invention is 100 is comprised of encasement 101, multiple photovoltaic sections 102, multiple hinges 103 and three output devices 109. For the purposes of illustration, energy storage component 104 is not shown but may be understood to be housed within encasement 101. It should further be understood that photovoltaic sections 102, as depicted, are an elongated "L" shape and forming, as shown, six photovoltaic sections 102 and where each side of the "L" cross-section is photoactive. The six elongated "L" shaped photovoltaic sections 102 are connected by five hinges 103 and allowing for the folding of each photovoltaic section 102 into its adjacent photovoltaic section 102 and forming a nested series. The center hinge 103 provides for the separation of two nested groupings of photovoltaic sections 102.

Now referring to FIG. 10B, a dimensional comparison is provided for two similarly embodied versions of the present invention wherein present invention 100A depicts the present invention as described in FIG. 10A that contains larger photovoltaic sections and multiple output devices 109 (as listed in FIG. 10A). Present invention 100B depicts the present invention as described in FIG. 6A and FIG. 6B that, as described in those figures, has one output device 109. It should be understood the purpose of FIG. 10 is to demonstrate the present invention 100 can be manifested as a portable device of various size, weights and dimensions.

The advantages of the present invention include, without limitation, the ability to provide a portable photovoltaic device capable of expanding into a larger photovoltaic device to provide for the generation of electricity in multiple, including remote, locations and where such electricity generation may be provided for the powering or recharging of secondary electrical or electronic devices enabling an end user to more readily, and more continuously, utilize those devices.

In broad embodiment, the present invention is a collapsible solar panel with embedded battery storage and common electrical interconnect.

DESCRIPTION OF THE PREFERRED EMBODIMENTS

Best Modes for Carrying Out the Invention

The present invention should be understood first to be a portable photovoltaic device that as a device can be scalable to different sizes and configurations ranging from small-scale, handheld, devices that may power a single, small, electrical device to larger, heavy duty, devices that may be used power multiple electrical devices. The preferred embodiment is, therefore, the embodiment, on any scale, in which the present invention has multiple photovoltaic section that can be alternatively collapsed for transportation and unfurled for generating electricity and where the present invention has embedded energy storage and at least one common method for electrical interconnect.

The present invention may be utilized as an alternative to electricity-generating devices and, as a small handheld unit that is used in conjunction with secondary devices, may also act as a substitute for singular devices such as flashlights, lanterns, radios and others electrical and electronic components and devices.

INDUSTRIAL APPLICABILITY

The invention is further illustrated by the following non-limiting examples.

Example 1

The present invention may act as a handheld recharging device that may be utilized by many different end users but that may be best utilized by a hiking camper whose energy needs afield may be varied. As a handheld unit, the present invention can easily be placed into a backpack in its closed configuration. Once afield, the camper can unpack the present invention and place it into the sunlight in its unfolded configuration thus allowing for the greatest amount of incident light to strike the photovoltaic sections of the present invention. At night, the camper may use the present invention alternatively once it is in its closed configuration. The camper may add an add-on component that serves as a flashlight or a second device that acts as a lantern. In the first instance, the camper may need task lighting such as that provided by a directed beam to search for firewood or other task. In the second instance, the camper may prefer softer light provided in an areas, such as inside of a tent, and where this goal is made manifest through use of a lantern. Finally, camper may additionally choose to remove the lantern and connect a cellular telephone to the present invention in order to recharge the cellular phone.

Example 2

The present invention may be configured as a more powerful device to provide additional electricity generation for multiple devices. No longer a handheld device, the present invention is still portable and may be lifted without aid by one person. By example, a second camper loads the present invention into a car to transport the device to a drive-in campsite. At the campsite, the drive-in camper unloads the present invention and unfolds it in order to begin charging. The present invention is configured with Onboard battery storage and, through the course of the day, the batteries are charged. At the end of the day, without folding the present invention back into its closed configuration, the camper may access multiple power ports to simultaneously electrify various devices such as a lantern, a radio while also acting to recharge a cellular telephone.

The preceding examples can be repeated with similar success by substituting the generically or specifically described parameters and/or operating conditions of this invention for those used in the preceding examples.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

I claim:

1. A hand-carried portable photovoltaic recharging device comprising at least two photovoltaic sections each made from a rigid material formed to have a convex exterior side and a concave interior side to form an elongated L-shaped structure and wherein:
   a. each photovoltaic section contains at least one photovoltaic cell on its convex exterior side;
   b. each photovoltaic section is attached to and separated from another photovoltaic section by a common operable hinge;
   c. each common operable hinge provides for each photovoltaic section to be manipulated into open and closed positions;
   d. at least one of the at least two photovoltaic sections is attached to an encasement that contains electrical components necessary for operating the hand-carried portable photovoltaic recharging device;
   e. wherein each subsequent photovoltaic section from a center hinge is marginally smaller in dimension than that of a preceding photovoltaic section such that each L-shaped photovoltaic section will fold, by means of each common operable hinge, into a concave interior side of an adjacent photovoltaic section such that the at least two photovoltaic sections are nested when the hand-carried portable photovoltaic recharging device is closed; and
   f. the closed hand-carried portable photovoltaic recharging device forms a rectangular structure.

2. A hand-carried portable photovoltaic recharging device comprising of two photovoltaic sections, wherein each photovoltaic section is made from a rigid material and shaped to each have a convex exterior side and a concave interior side to form an elongated L-shaped structure and wherein:
   a. each photovoltaic section contains at least one photovoltaic cell on its convex exterior side;
   b. each concave interior side contains one or more support stands that protrude from the concave interior side and forming vacant recessed areas between each support stand;
   c. each photovoltaic section is attached to and separated from another photovoltaic section by a common operable hinge;
   d. the common operable hinge provides for each photovoltaic section to be manipulated into open and closed positions;
   e. the common operable hinge also provides for physical and electrical interconnections of both sides of the hand carried portable photovoltaic recharging device;
   f. wherein the support stands are shaped to fit into a vacant recessed area of a concave interior side of an adjoining photovoltaic section when the hand carried portable photovoltaic recharging device is closed;
   g. the hand carried portable photovoltaic recharging device forms a rectangular structure when closed;
   h. the photovoltaic cells are electrically interconnected in series, parallel or a combination of series and parallel;
   i. the photovoltaic cells are electrically interconnected to an energy storage component through a blocking diode;
   j. the energy storage component is electrically interconnected to an external electrical connection;
   k. at least one of the photovoltaic sections is physically connected to at least one encasement; and
   l. each encasement is constructed from a rigid material.

3. A hand-carried portable, floating photovoltaic recharging device comprising of at least two separate photovoltaic sections, each separate photovoltaic section made from a rigid material formed to have a convex exterior side and a concave interior side to form an elongated L-shaped structure comprised of at least one photovoltaic cell enclosed in a rigid form,
   wherein at least one of the at least two separate photovoltaic sections is physically connected to an encasement;
   wherein subsequent photovoltaic sections are attached to each other by common hinges between each photovoltaic section;
   wherein the encasement is comprised of a rigid material that houses at least one energy storage device, at least one electric circuit and at least one external electrical connection; and
   wherein the encasement is comprised of a minimum of 70 wt % low-density polyurethane elastomer.

* * * * *